United States Patent
Kim

(10) Patent No.: US 8,042,832 B2
(45) Date of Patent: Oct. 25, 2011

(54) AIRBAG OF VEHICLE

(75) Inventor: Gun Woo Kim, Seongnam-si (KR)

(73) Assignee: Hyundai Mobis Co., Ltd., Gyeonggi-Do (KR)

( * ) Notice: Subject to any disclaimer, the term of this patent is extended or adjusted under 35 U.S.C. 154(b) by 215 days.

(21) Appl. No.: 12/467,834

(22) Filed: May 18, 2009

(65) Prior Publication Data

US 2009/0283998 A1    Nov. 19, 2009

(30) Foreign Application Priority Data

May 19, 2008  (KR) .......................... 10-2008-0045870

(51) Int. Cl.
 *B60R 21/16*   (2006.01)
(52) U.S. Cl. .................................. 280/743.2; 280/743.1
(58) Field of Classification Search ............... 280/743.2, 280/743.1, 740
 See application file for complete search history.

(56) References Cited

U.S. PATENT DOCUMENTS

| | | | | |
|---|---|---|---|---|
| 5,765,867 A | * | 6/1998 | French | 280/743.2 |
| 6,883,831 B2 | * | 4/2005 | Hawthorn et al. | 280/739 |
| 6,955,377 B2 | * | 10/2005 | Cooper et al. | 280/743.1 |
| 7,152,875 B2 | * | 12/2006 | Kai | 280/739 |
| 7,396,044 B2 | * | 7/2008 | Bauer et al. | 280/743.2 |
| 7,658,408 B2 | * | 2/2010 | Zofchak et al. | 280/743.2 |
| 7,793,978 B2 | * | 9/2010 | Vigeant et al. | 280/743.2 |

\* cited by examiner

*Primary Examiner* — Eric Culbreth
(74) *Attorney, Agent, or Firm* — Birch, Stewart, Kolasch & Birch, LLP

(57) ABSTRACT

The airbag of the vehicle according to the present invention can suppress initial deployment of a cushion and minimize injury of an occupant caused by a pressure upon deployment of the cushion since outer tethers covering the outer side of the cushion are sewn and coupled to the cushion at a plurality of positions and a plurality of sewing portions are adapted to be sequentially broken according a deployment pressure of the cushion. Therefore, injury of an occupant in an OOP (Out-of-Position) condition can be prevented. Furthermore, the airbag can optimally cope with various collision modes because the outer tethers are formed in plural number and the sewing strength of the plurality of outer tethers can be adjusted. Furthermore, deviation in the performance of the outer tethers can be decreased compared to a tear line because the outer tethers are sewn to the cushion and the sewing portions are broken by a deployment pressure of the cushion. Furthermore, deviation in the performance of the outer tethers can be decreased since the outer tethers are sewn and fixed to the cushion.

17 Claims, 6 Drawing Sheets

AIRBAG OF VEHICLE

BACKGROUND OF THE DISCLOSURE

1. Field of the Invention

The present invention relates to an airbag of a vehicle, and more particularly, to an airbag of a vehicle which can reduce injury of an occupant by sequentially supporting the deployment of the cushion, rather than controlling the deployment of the cushion once at a given instant, by improving the shape and coupling structure of outer tethers.

2. Description of the Background Art

Generally, an airbag is installed to protect the face, chest, etc. of an occupant in the event of a vehicle collision. Usually, such an airbag is designed and mounted with reference to a standard size of an adult male.

Thus, an occupant whose body size is different from a normal one cannot be afforded full optimal protection from the air bag, and in some cases may be injured by the airbag.

Especially, a condition in which the occupant will be most injured upon deployment of the airbag, among various conditions that may occur in addition to the condition of a standard body size, is referred to as "Out-Of-Position (OOP)" condition.

Further, to suit the OOP condition, a dual bag or an outer tether having a special function are under improvement to attain an optimal condition. The outer tether is also used to improve the OOP condition, and generally referred to as an "Occupant Protection Flap (OPF)". The outer tether functions to weaken the initial deployment force of the cushion by being covered and supported on the outer side of the cushion in order to avoid a given part of the cushion from being aggressively deployed toward the occupant when deployed upon receipt of a deployment gas injected from an inflator, that is, in order to protect the occupant from getting injured by preventing an out-of-force phenomenon, then reduces injury of the occupant by directing the deployment of the cushion to both sides, and then is normally deployed as the tear line is torn to provide a normal airbag function for an occupant.

FIG. 1 is a view showing a deployment state of an airbag of a vehicle according to the conventional art. FIG. 2 is an elevation view showing an outer tether of the airbag of the vehicle according to the conventional art.

As shown in FIG. 1, the airbag comprises a cushion 1 deployed by gas injection and an outer tether 3 whose both sides are fixed to a retainer 2 and which delays deployment while covering and supporting the outside of the cushion 1.

As shown in FIG. 1 or FIG. 2, the airbag comprises a tear line 5 formed at a center side of the outer tether 3 and torn upon inflation of the cushion 1 and fixing holes 4 formed on both sides of the outer tether 3 to be coupled with the retainer 2, so that the tear line 5 is torn sequentially in spite of a deviation caused by the deployment of the cushion 1 by pulling some part of the outer tether 3 and fixing it to the retainer 2.

The cushion 1 is accommodated folded multiple times in a main panel (not shown), and disposed to communicate with a gas ejection port (not shown) of an inflator (not shown).

The outer tether 3 comprises a rectangular fabric, and is provided on both sides with a fixing portion having fixing holes 4 whose ends are coupled and fixed to the retainer 2. The outer tether 3 is assembled by fitting and fixing the fixing holes 4 to stud bolts (not shown) at both sides of the outer tether 3 that are secured to the retainer 2.

Moreover, the outer tether 3 is disposed so as to temporarily delay inflation of some part of the deployment surface upon deployment of the cushion 1 and direct the deployment of the cushion 1 to both sides of the front surface.

However, the airbag of the vehicle according to the conventional art is configured such that in case of an outer tether applied to a conventional passenger airbag, force is exerted to the entire part of the cushion upon deployment of the cushion owing to the shape and coupling structure of the outer tether. In this case, initial injury of an occupant may be reduced by blocking a portion deployed to the occupant for a certain amount of time by deployment of the cushion. However, a child sitting on a child seat may be seriously injured since the neck is pressed with a force pressing down on the child as the cushion is deployed after the function of the outer tether is over and the restraining is released. Besides, the outer tether is not fixed to a given region, and this causes the cushion to be deployed toward one side or in an unintended direction upon deployment of the cushion.

SUMMARY OF THE INVENTION

It is, therefore, an object of the present invention to provide to an airbag of a vehicle which can reduce injury of an occupant by sequentially supporting the deployment of the cushion, rather than controlling the deployment of the cushion once at a given instant in time by improving an outer tether in such a manner that the shape of the outer tether is divided into an upper outer tether and a lower outer tether and the coupling structure is sewn.

Another object of the present invention is to provide an airbag of a vehicle which can achieve optimum protection of an occupant according to various collision modes in a case that the direction is reversed or tuned, as well as restraining the lower outer tether for reducing injury of a child occupant.

Still another object of the present invention is to provide an airbag of a vehicle which can direct a deployment of the cushion in a predetermined manner upon deployment of the cushion because the upper and lower outer tethers are fixed and disposed onto the front surface.

An airbag of a vehicle according to the present invention includes: a cushion deployed by gas ejected from an inflator in the event of a vehicle collision; outer tethers disposed to cover some part of the outer side of the cushion for suppressing initial deployment of the cushion; and a plurality of sewing portions for joining the cushion and the outer tethers together at a plurality of positions by sewing, and being sequentially broken according to a deployment pressure of the cushion.

In the present invention, the outer tethers may be longitudinally disposed in an up-down direction perpendicular to the deployment direction of the cushion.

Furthermore, in the present invention, the plurality of sewing portions may be disposed at a plurality of locations spaced apart at predetermined intervals in an up-down direction perpendicular to the deployment direction of the present invention.

Furthermore, in the present invention, the outer tethers may include: an upper outer tether longitudinally disposed longitudinally disposed in an up-down direction at an outer upper part of the cushion for suppressing initial deployment of the upper part of the cushion; and a lower outer tether longitudinally disposed in an up-down direction at an outer lower part of the cushion for suppressing initial deployment of the lower part of the cushion.

Furthermore, in the present invention, the plurality of sewing portions may include: an upper sewing portion for sewing the cushion and the upper outer tether; and a lower sewing portion for sewing the cushion and the lower outer tether.

Furthermore, in the present invention, the upper sewing portion and the lower sewing portion may be spaced apart from a predetermined distance from each other.

Furthermore, in the present invention, the airbag of the vehicle may further include an airbag housing for accommodating the cushion and a retainer for coupling to the airbag housing and fixing the cushion, and the upper end of the upper outer tether and the lower end of the lower outer tether may be respectively fixed to the retainer.

Furthermore, in the present invention, the airbag of the vehicle may further include an inter-tether sewing portion for joining the upper outer tether and the lower outer tether together.

Furthermore, in the present invention, the inter-tether sewing portion is for sewing the facing surfaces of the upper outer tether and lower outer tether.

Furthermore, in the present invention, the inter-tether sewing portion may be disposed in plural number in such a manner as to be spaced apart at predetermined intervals in the deployment direction of the cushion.

Furthermore, in the present invention, the sewing strength of at least one of the plurality of sewing portions may be differently set from those of the rest of the sewing portions.

Furthermore, in the present invention, the lower sewing portion may be sewn more firmly than the upper sewing portion.

Furthermore, in the present invention, the upper sewing portion may be broken before the lower sewing portion is according to a deployment pressure of the cushion, and the lower sewing portion may be torn by an occupant's force pressing down on the upper part of the cushion being deployed and the deployment pressure of the cushion.

An airbag of a vehicle according another aspect of the present invention includes: a cushion deployed by gas ejected from an inflator in the event of a vehicle collision; an upper outer tether disposed to cover an upper part of the outer side of the cushion for suppressing initial deployment of the upper part of the cushion; a lower outer tether disposed to cover a lower part of the outer side of the cushion for suppressing initial deployment of the lower part of the cushion; an upper sewing portion for sewing the cushion and the upper outer tether, and being broken according to a deployment pressure of the cushion; a lower sewing portion for sewing the cushion and the lower outer tether, and being broken after the upper sewing portion is separated; and an inter-tether sewing portion for joining the upper outer tether and the lower outer tether.

Furthermore, in the present invention, the upper sewing portion, the lower sewing portion, and the inter-tether sewing portion may be sequentially broken according to the deployment pressure of the cushion.

Furthermore, in the present invention, the sewing strength of at least one of the upper sewing portion, the lower sewing portion, and the inter-tether sewing portion may be differently set from those of the rest of the sewing portions.

Furthermore, in the present invention, the inter-tether sewing portion, the upper sewing portion, and the lower sewing portion may be broken in this order.

Furthermore, in the present invention, the inter-tether sewing portion may be disposed in plural number in such a manner as to be spaced apart at predetermined intervals in the deployment direction of the cushion.

Furthermore, in the present invention, the airbag of the vehicle may further include an airbag housing for accommodating the cushion and a retainer for coupling to the airbag housing and fixing the cushion, and the upper end of the upper outer tether and the lower end of the lower outer tether may be respectively fixed to the retainer.

An airbag of a vehicle according still another aspect of the present invention includes: a cushion deployed by gas ejected from an inflator in the event of a vehicle collision; a plurality of outer tethers disposed to cover some part of the outer side of the cushion for suppressing initial deployment of the cushion; a cushion inter-tether sewing portion for joining the cushion and the outer tethers together at a plurality of positions by sewing, and being sequentially broken according to a deployment pressure of the cushion; and an inter-tether sewing portion for joining the plurality of outer tethers together by sewing, and being sequentially broken according to a deployment pressure of the cushion.

The airbag of the vehicle according to the present invention can suppress initial deployment of a cushion and minimize injury of an occupant caused by a pressure upon deployment of the cushion since outer tethers covering the outer side of the cushion are sewn and coupled to the cushion at a plurality of positions and a plurality of sewing portions are adapted to be sequentially broken according a deployment pressure of the cushion. Therefore, injury of an occupant in an OOP (Out-of-Position) condition can be prevented.

Furthermore, the airbag can optimally cope with various collision modes because the outer tethers are formed in plural number and the sewing strength of the plurality of outer tethers can be adjusted.

Furthermore, deviation in the performance of the outer tethers can be decreased compared to a tear line because the outer tethers are sewn to the cushion and the sewing portions are broken by a deployment pressure of the cushion.

Furthermore, deviation in the performance of the outer tethers can be decreased since the outer tethers are sewn and fixed to the cushion.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Hereinafter, an exemplary embodiment of the present invention will be described in detail with reference to the accompanying drawings.

Figure 1:
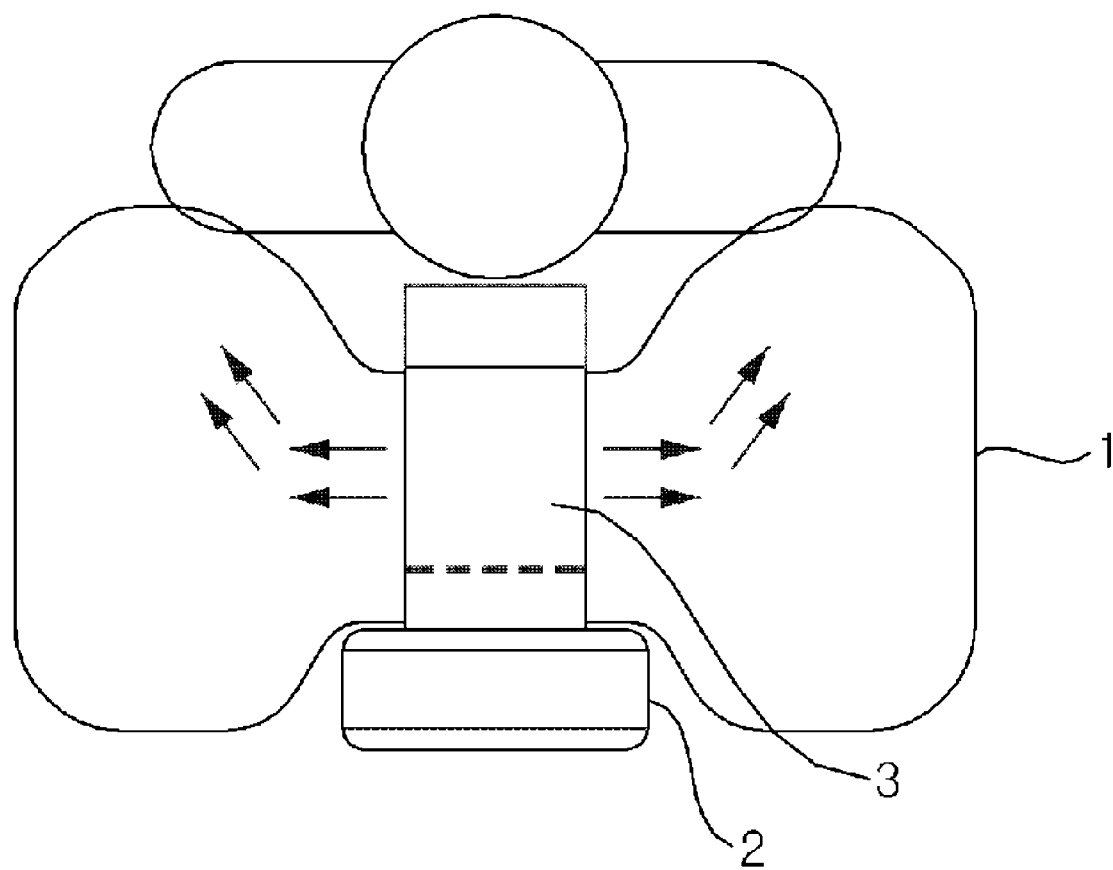
FIG. 1 is a view showing a deployment state of an airbag of a vehicle according to the conventional art.
Figure 2:
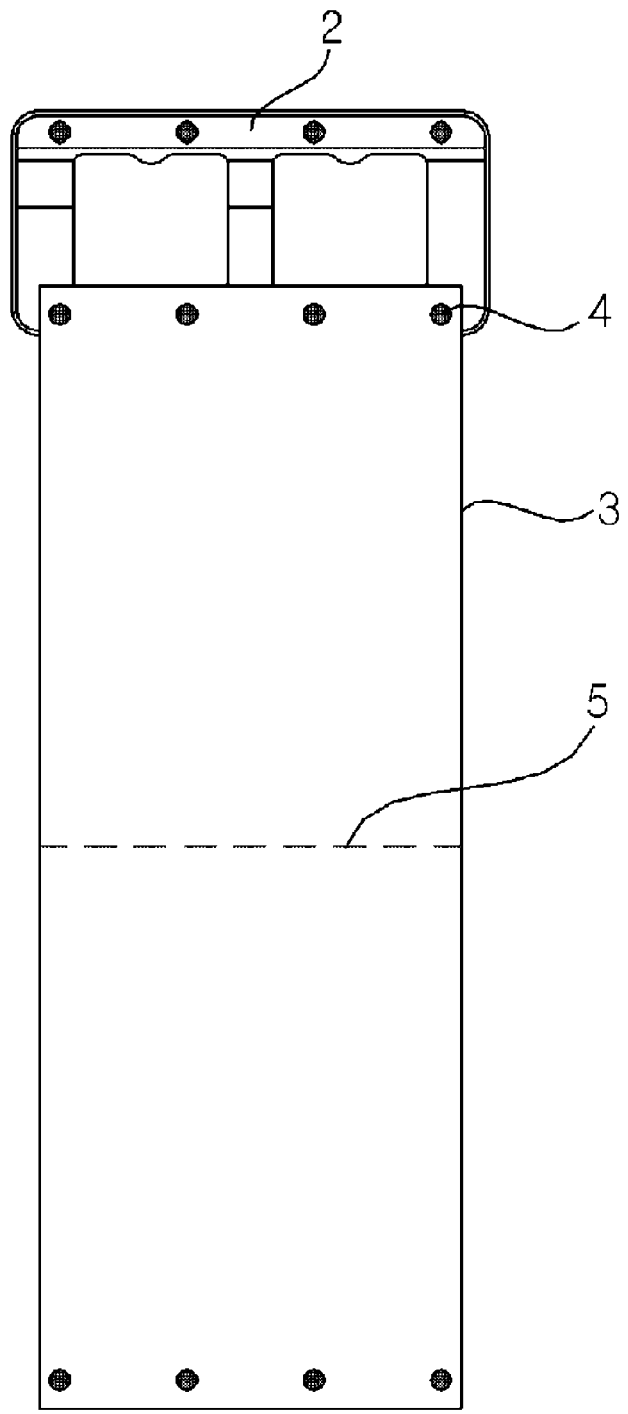
FIG. 2 is an elevation view showing an outer tether of the airbag of the vehicle according to the conventional art.
Figure 3:
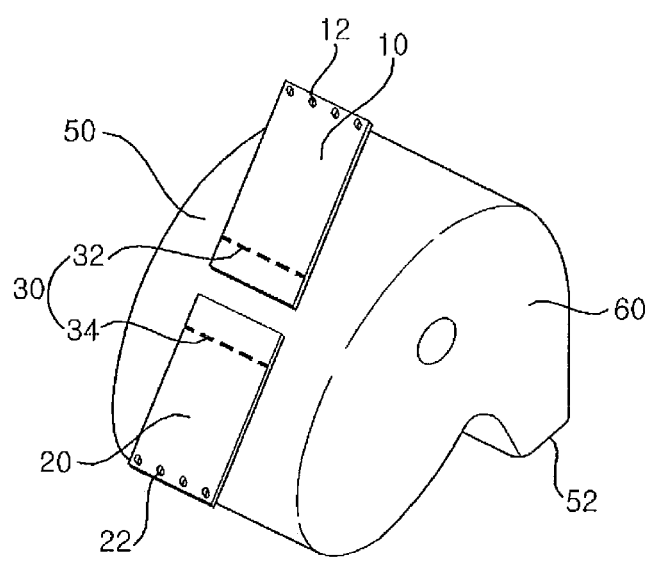
FIG. 3a is a perspective view showing outer tethers and upper and lower sewing portions of an airbag of a vehicle according to the present invention.
FIG. 3b is an elevation view showing the outer tethers and upper and lower sewing portions of the airbag of the vehicle according to the present invention.
Figure 3:
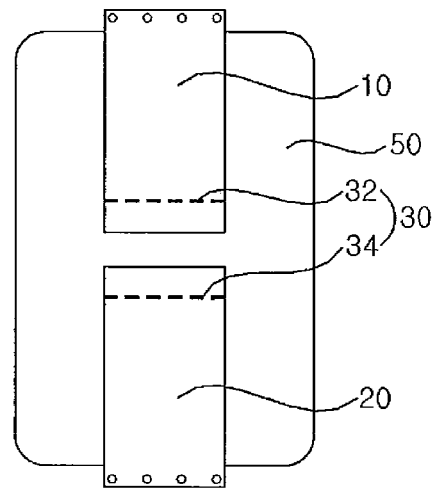
Figure 4:
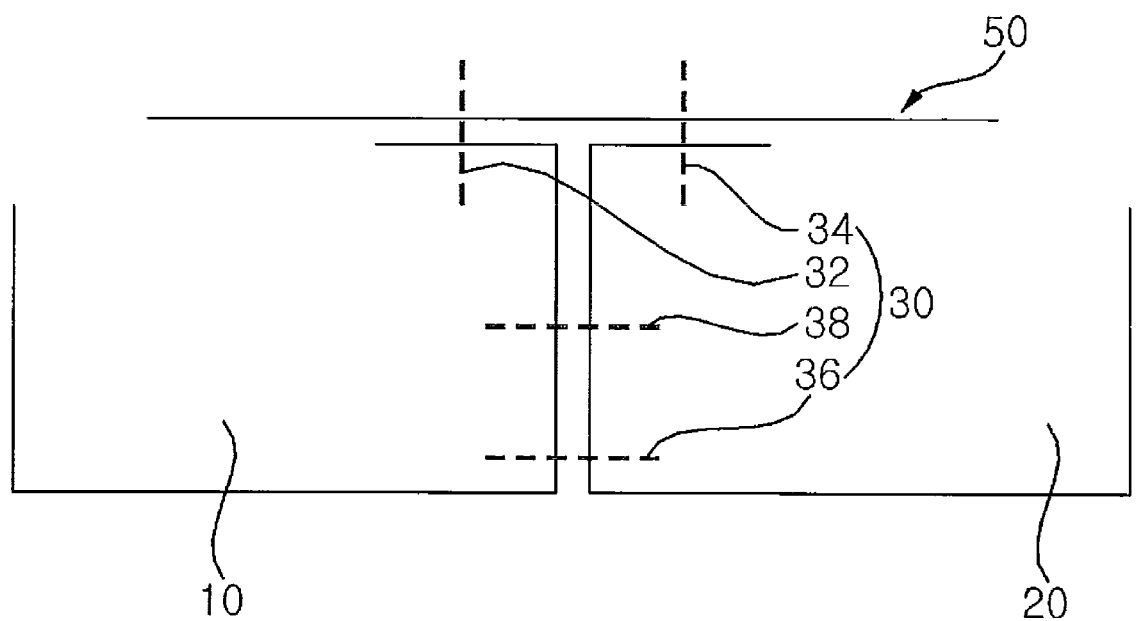
FIG. 4 is a side view schematically showing a final coupling structure of the outer tethers according to the present invention.
Figure 5:
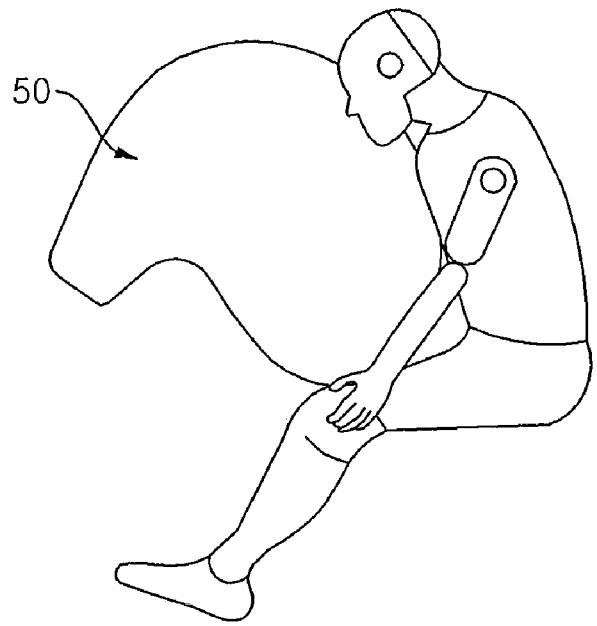
FIG. 5a is a view schematically showing a deployment of the cushion of the airbag of the vehicle according to an exemplary embodiment of the present invention.
FIG. 5b is a view of initial deployment of the cushion of the airbag of the vehicle according to the exemplary embodiment of the present invention when viewed from above.
FIG. 5c is a view of deployment of an upper part of the cushion of the airbag of the vehicle according to the exemplary embodiment of the present invention when viewed from above.
Figure 5:
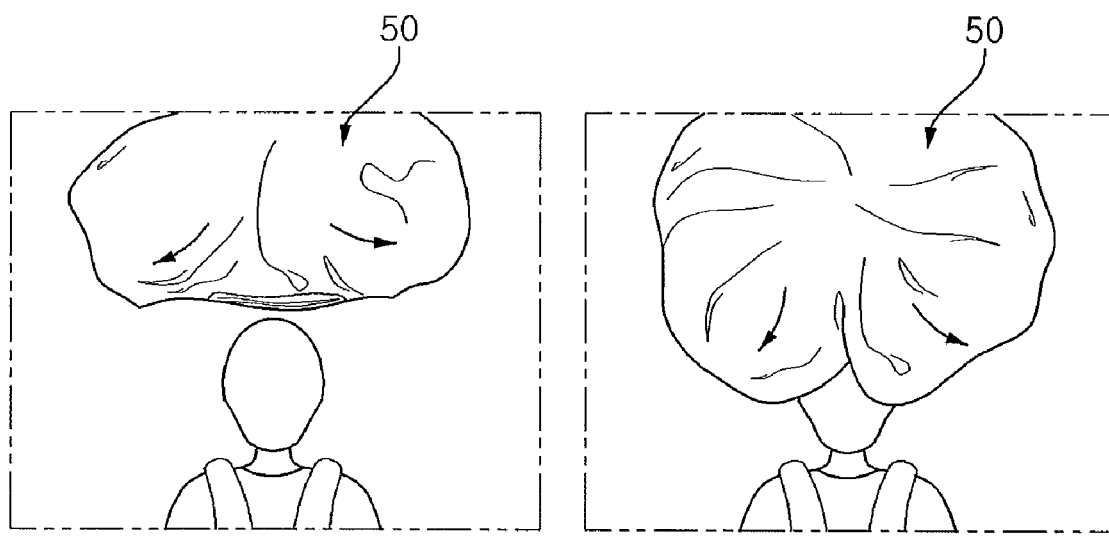
Figure 6:
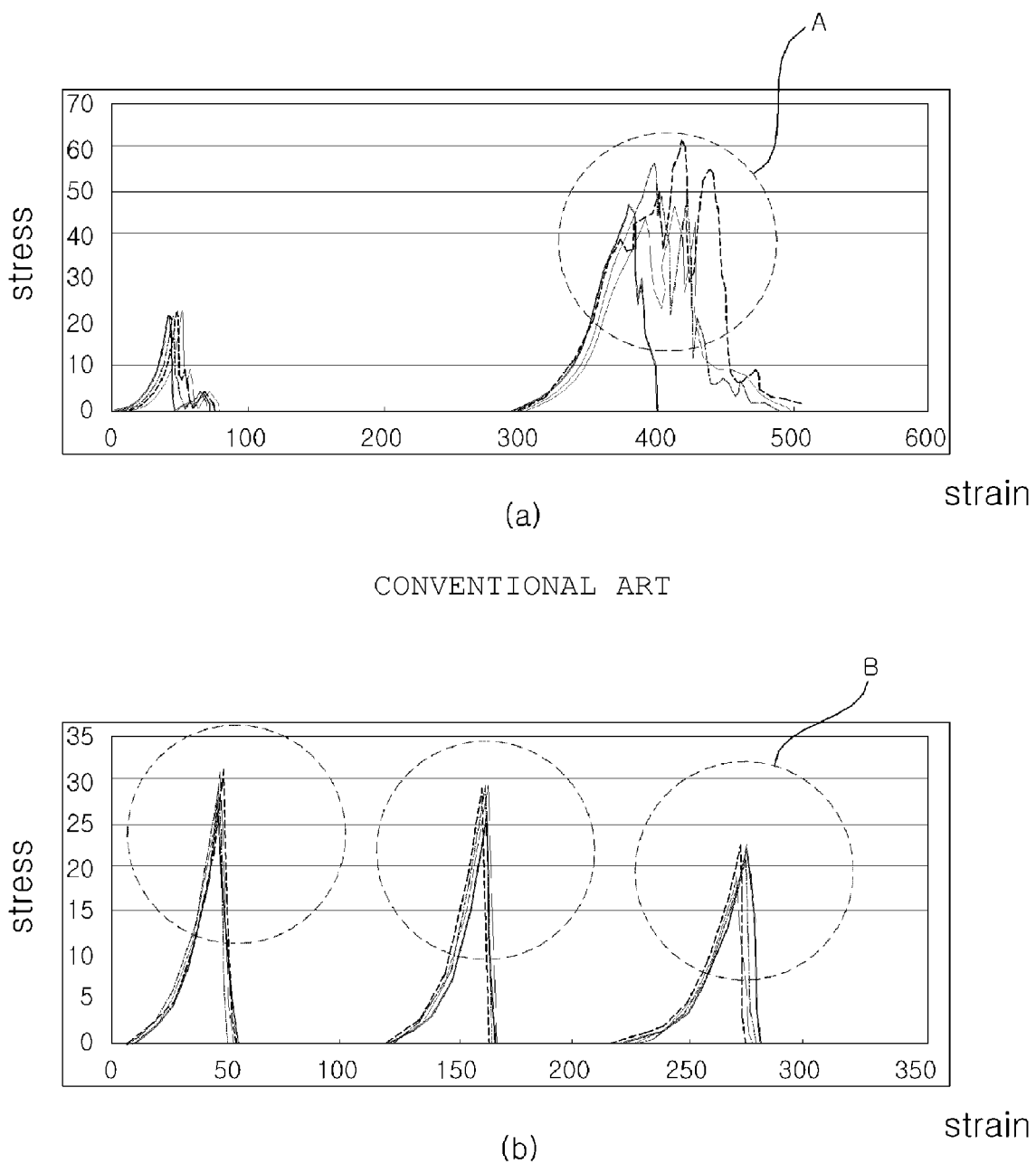
FIGS. 6a and 6b are charts showing tensile strength tests of a tear line method according to the conventional art and of a sewing method according to the present invention.

FIG. 3a is a perspective view showing outer tethers and upper and lower sewing portions of an airbag of a vehicle according to the present invention. FIG. 3b is an elevation view showing the outer tethers and upper and lower sewing portions of the airbag of the vehicle according to the present invention. FIG. 4 is a side view schematically showing a final coupling structure of the outer tethers according to the present invention. FIG. 5a is a view schematically showing a deployment of the cushion of the airbag of the vehicle according to an exemplary embodiment of the present invention. FIG. 5b is a view of initial deployment of the cushion of the airbag of the vehicle according to the exemplary embodiment of the present invention when viewed from above. FIG. 5c is a view of deployment of an upper part of the cushion of the airbag of the vehicle according to the exemplary embodiment of the present invention when viewed from above. FIGS. 6a and 6b are charts showing tensile strength tests of a tear line method according to the conventional art and of a sewing method according to the present invention.

As shown in FIGS. 3a and 3b, the airbag of the vehicle according to the present invention comprises a cushion 50 deployed by gas ejected from an inflator (not shown) in the event of a vehicle collision, outer tethers 10 and 20 spaced apart at one side of the cushion 50, and disposed to cover some part of the outer side of the cushion 50 for suppressing initial deployment of the cushion, and a plurality of sewing portions for joining the cushion 50 and the outer tethers 10 and 20 together at a plurality of positions by sewing, and being sequentially broken according to a deployment pressure of the cushion.

The cushion 50 is provided with an inlet portion 52 for receiving gas emitted from the inflator (not shown).

The outer tethers 10 and 20 are longitudinally disposed in an up-down direction perpendicular to the deployment direction of the cushion 50.

The outer tethers 10 and 20 comprise an upper outer tether 10 longitudinally disposed in an up-down direction at an outer upper part of the cushion 50 for suppressing initial deployment of the upper part of the cushion 50 and a lower outer tether 20 longitudinally disposed in an up-down direction at an outer lower part of the cushion 50 for suppressing initial deployment of the lower part of the cushion 50.

However, the present invention is not limited thereto, and the outer tethers may be formed in a piece and also may be sewn at a plurality of positions.

The airbag of the vehicle further comprises an airbag housing (not shown) for accommodating the cushion 50 and a retainer (not shown) for fixing the cushion 50 to the airbag housing (not shown).

The upper outer tether 10 and the lower outer tether 20 are provided with fixing holes 12 and 22, respectively, so as to be coupled to the retainer (not shown).

The upper end of the upper outer tether 10 is fixed to the retainer (not shown), and the lower end of the upper outer tether 10 is sewn to the cushion 50.

The lower end of the lower outer tether 20 is fixed to the retainer (not shown), and the upper end of the lower outer tether 20 is sewn to the cushion 50.

The plurality of sewing portions 30 comprises an upper sewing portion 32 for sewing the cushion 50 and the upper outer tether 10 and a lower sewing portion 34 for sewing the cushion 50 and the lower outer tether 20.

The upper sewing portion 32 and the lower sewing portion 34 are spaced apart from a predetermined distance from each other.

Furthermore, the airbag of the vehicle further comprises an inter-tether sewing portion for joining the upper outer tether 10 and the lower outer tether 20 together.

The inter-tether sewing portion is for sewing the facing surfaces of the upper outer tether 10 and lower outer tether 20.

Also, the inter-tether sewing portion may be disposed in plural number in such a manner as to be spaced apart at predetermined intervals in the deployment direction of the cushion.

That is, the inter-tether sewing portion further comprises front and rear inter-tether sewing portions 36 and 38 that are sewn to the facing ends of the upper outer tether 10 and lower outer tether 20 and provided for suppressing the cushion 40 from being deployed forward.

The front and rear inter-tether sewing portions 36 and 38 are spaced apart at a predetermined interval in a front-to-back direction so as to be broken by a predetermined force while suppressing the cushion 50 from being deployed forward.

The sewing strengths of the upper and lower sewing portions 32 and 34 and the front and rear inter-tether sewing portions 36 and 38 may be differently set. That is, the sewing strength of each sewing portion may be set in consideration of the deployment direction or deployment shape of the cushion 50. The sewing strength of each sewing portion may be adjusted by sewing threads or intervals of a sewing line.

Here, the lower sewing portion 34 is sewn more firmly than the upper sewing portion 32 so that the upper sewing portion 32 is broken first and then the lower sewing portion 34 is broken.

Now, operation of the present invention thus constructed will be described.

When a vehicle collision occurs, a high pressure gas is ejected from the inflator (not shown) by which gas the cushion 50 is filled and the cushion 50 is deployed.

When the cushion 50 starts to be deployed, the front and rear inter-tether sewing portions 36 and 38 suppress the cushion 50 from being instantaneously deployed forward.

That is, the front and rear inter-tether sewing portions 36 and 38 are able to prevent an occupant from getting injury by a deployment pressure of the cushion by limiting the amount of initial forward deployment of the cushion 50.

At this time, since the front and rear inter-tether sewing portions 36 and 38 are sequentially broken, the deployment of the cushion 50 is controlled not at one instant but sequentially, thereby preventing injury of the occupant more effectively.

Once the front and rear inter-tether sewing portions 36 and 38 are all broken, the cushion 50 is filled more and more and the upper and lower sewing portions 32 and 34 are sequentially broken.

As the upper sewing portion 32 is broken first, the upper part of the cushion 50 is filled and expanded before the lower part is.

At this point, the lower sewing portion 34 remains, and hence the deployment of the lower part of the cushion 50 is restrained by the lower outer tether 20.

In the case that an occupant having a small physical size, such as a child, is onboard, the lower part of the cushion 50 is prevented from crashing down on the head of the occupant, thereby preventing injury of the occupant.

Otherwise, in the case that an adult occupant with a normal physical size is onboard, the head of the occupant presses the upper part of the cushion 50, thus applying a pressure to a lower side of the cushion 50.

Accordingly, as the lower sewing portion 34 is broken, the cushion 50 is deployed.

As described above, since the upper and lower sewing portions 32 and 34 and the front and rear sewing portions 36 and 38 are formed, the cushion 50 is fixed to a certain part of the main panel, thus preventing the cushion 50 from being eccentrically deployed or being deployed in an unintended direction during a vehicle collision.

Regarding the airbag of a vehicle of a fabric tear line type of FIG. 6a, it can be seen that severe deviations in tensile strength are generated due to dispersion caused by the control of the tear line in a tensile strength test as shown in part A indicated by a circular dotted line. Regarding the airbag of a vehicle of a fabric sewing line type of FIG. 6b, it can be seen that no deviation in tensile strength is generated in case of dispersion caused by sewing control as shown in part B indicated by a circular dotted line.

Therefore, in the airbag of a vehicle according to the present invention, the airbag of a sewing line type has an advantage of directing deployment in a predetermined manner upon deployment of the cushion.

Although the present invention has been described with reference to the embodiment shown in the drawings, it is merely illustrative, and those skilled in the art will understand that various modifications may be made without departing from the spirit and scope of the present invention. Consequently, the true technical protective scope of the present invention must be determined based on the technical spirit of the appended claims.

The airbag of a vehicle according to the present invention can be utilized as an airbag of a vehicle which can reduce injury of an occupant by sequentially supporting the deployment of the cushion, rather than controlling the deployment of the cushion once at a given instant by improving the shape and coupling structure of outer tethers.

What is claimed is:

1. An airbag of a vehicle, comprising:
    a cushion deployed by gas ejected from an inflator in an event of a vehicle collision;
    a plurality of outer tethers disposed to cover some part of an outer side of the cushion for suppressing an initial deployment of the cushion and having fixing holes to be coupled to a retainer for fixing the cushion; and
    a plurality of sewing portions for joining the cushion and the outer tethers together at a plurality of positions by sewing, and being sequentially broken according to a deployment pressure of the cushion.

2. The airbag of claim 1, wherein the outer tethers are longitudinally disposed in an up-down direction perpendicular to a deployment direction of the cushion.

3. The airbag of claim 1, wherein the plurality of sewing portions are disposed at a plurality of locations spaced apart at predetermined intervals in an up-down direction perpendicular to a deployment direction of the cushion.

4. The airbag of claim 1, wherein the outer tethers comprise:
    an upper outer tether longitudinally disposed longitudinally disposed in an up-down direction at an outer upper part of the cushion for suppressing initial deployment of the upper part of the cushion; and
    a lower outer tether longitudinally disposed in an up-down direction at an outer lower part of the cushion for suppressing initial deployment of the lower part of the cushion.

5. The airbag of claim 4, wherein the plurality of sewing portions comprise:
    an upper sewing portion for sewing the cushion and the upper outer tether; and
    a lower sewing portion for sewing the cushion and the lower outer tether.

6. The airbag of claim 5, wherein the upper sewing portion and the lower sewing portion are spaced apart from a predetermined distance from each other.

7. The airbag of claim 5, wherein the lower sewing portion is sewn more firmly than the upper sewing portion.

8. The airbag of claim 4, further comprising an inter-tether sewing portion for joining the upper outer tether and the lower outer tether together.

9. The airbag of claim 8, wherein the inter-tether sewing portion is for sewing facing surfaces of the upper outer tether and lower outer tether.

10. The airbag of claim 8, wherein the inter-tether sewing portion is disposed in plural number in such a manner as to be spaced apart at predetermined intervals in a deployment direction of the cushion.

11. The airbag of claim 1, wherein a sewing strength of at least one of the plurality of sewing portions is differently set from those of the rest of the sewing portions.

12. An airbag of a vehicle, comprising:
    a cushion deployed by gas ejected from an inflator in an event of a vehicle collision;
    an upper outer tether disposed to cover an upper part of an outer side of the cushion for suppressing an initial deployment of the upper part of the cushion;
    a lower outer tether disposed to cover a lower part of the outer side of the cushion for suppressing an initial deployment of the lower part of the cushion;
    an upper sewing portion for sewing the cushion and the upper outer tether, and being broken according to a deployment pressure of the cushion;
    a lower sewing portion for sewing the cushion and the lower outer tether, and being broken after the upper sewing portion is separated; and
    an inter-tether sewing portion for joining the upper outer tether and the lower outer tether.

13. The airbag of claim 12, wherein the upper sewing portion, the lower sewing portion, and the inter-tether sewing portion are sequentially broken according to the deployment pressure of the cushion.

14. The airbag of claim 12, wherein the sewing strength of at least one of the upper sewing portion, the lower sewing portion, and the inter-tether sewing portion is differently set from those of the rest of the sewing portions.

15. The airbag of claim 14, wherein the inter-tether sewing portion, the upper sewing portion, and the lower sewing portion are broken in this order.

16. The airbag of claim 12, wherein the inter-tether sewing portion is disposed in plural number in such a manner as to be spaced apart at predetermined intervals in the deployment direction of the cushion.

17. An airbag of a vehicle, comprising:
    a cushion deployed by gas ejected from an inflator in an event of a vehicle collision;

a plurality of outer tethers disposed to cover some part of an outer side of the cushion for suppressing an initial deployment of the cushion;

a plurality of sewing portions for joining the cushion and the outer tethers together at a plurality of positions by sewing, and being sequentially broken according to a deployment pressure of the cushion; and a plurality of inter-tether sewing portions for joining the plurality of outer tethers together by sewing, and being sequentially broken according to the deployment pressure of the cushion.

* * * * *